(12) United States Patent
Roll et al.

(10) Patent No.: US 7,380,767 B2
(45) Date of Patent: Jun. 3, 2008

(54) VALVE

(75) Inventors: John Michael Roll, Fawkham (GB); Peter Michael Woodard, Horndon-on-the-Hill (GB); Andrew Albert Ellingham, Dartford (GB); Terence William Thomas Young, Gravesend (GB)

(73) Assignee: AAF-MCQUAY, Inc., Louisville, KY (US)

( * ) Notice: Subject to any disclaimer, the term of this patent is extended or adjusted under 35 U.S.C. 154(b) by 52 days.

(21) Appl. No.: 10/541,636

(22) PCT Filed: Dec. 31, 2003

(86) PCT No.: PCT/GB03/05706

§ 371 (c)(1), (2), (4) Date: Jul. 5, 2005

(87) PCT Pub. No.: WO2004/063825

PCT Pub. Date: Jul. 29, 2004

(65) Prior Publication Data

US 2006/0151731 A1  Jul. 13, 2006

(30) Foreign Application Priority Data

Jan. 9, 2003   (GB)   ................. 0300476.9

(51) Int. Cl.
*F16K 31/44* (2006.01)
*F16K 31/00* (2006.01)
*F16K 35/00* (2006.01)

(52) U.S. Cl. .................... 251/82; 251/63.6; 251/95

(58) Field of Classification Search ............. 251/82, 251/83, 95, 96, 266, 63.6, 63.5, 62, 129.04; 137/557

See application file for complete search history.

(56) References Cited

U.S. PATENT DOCUMENTS 3,707,987 A * 1/1973 Gordon ............... 137/543

(Continued)

FOREIGN PATENT DOCUMENTS

WO    WO 98/15788    4/1999

OTHER PUBLICATIONS

International Preliminary Examination Report, "European Patent Office," Dated Mar. 11, 3005, 8 Pages.

(Continued)

*Primary Examiner*—Ramesh Krishnamurthy
*Assistant Examiner*—Andrew J Rost
(74) *Attorney, Agent, or Firm*—Clement A. Berard, Esq.; Dann, Dorfman, Herrell & Skillman, P.C.

(57) ABSTRACT

A valve comprises a housing (1) having an inlet (4) and an outlet (5), and a pressure sensing port (8). A piston (6) slides in a part (3) of the housing (1) in response to a difference between a first fluid pressure at the pressure sensing port on the one side of the piston, and a second fluid pressure at the inlet and/or outlet on the other side of the piston (6). A valve member (7) carried by the piston is operable thereby to close the inlet (4) when said second fluid pressure is less than a value sufficiently greater than said first fluid pressure. The valve member (7) is movable with respect to the piston (6) to facilitate closing of the inlet (4), in response to a fluid flow from the housing (1) to the inlet (4), when the piston is not acting to close the inlet.

17 Claims, 5 Drawing Sheets

U.S. PATENT DOCUMENTS 3,982,561 A     9/1976  Harthun
4,307,654 A  *  12/1981 de Almeida ................. 91/441
4,699,355 A  *  10/1987 Tomlin et al. ................ 251/62
5,390,697 A      2/1995 Muschelknautz
5,586,744 A  *  12/1996 Smith et al. ............... 251/61.5
5,813,655 A  *   9/1998 Pinchott et al. ........ 251/129.04

OTHER PUBLICATIONS

UK Patent Office Search Report, "Application Number: GB 0300476.9," Dated Jun. 24, 2003, 1 page.
PCT International Search Report, Dated Apr. 21, 2004, 3 Pages.

* cited by examiner

VALVE

This Application is the United States National Stage of PCT International Application No. PCT/GB2003/005706 filed on 31 Dec. 2003, which claims the priority of United Kingdom Patent Application No. GB 0300476.9 filed on 9 Jan. 2003, now abandoned, and hereby claims the priority of each of the foregoing applications.

BACKGROUND TO THE INVENTION

This invention relates to a valve, particularly, but not exclusively, for use in connection with a compressor.

Refrigeration and air-conditioning compressors often rely on the pressure difference generated by the compressor to provide the pressure difference needed to inject oil into the compressor for lubricating, sealing and cooling purposes. The pressure at the inlet (or "suction") of the compressor is dictated by the refrigeration duty being performed at the time. The delivery pressure at the outlet is dictated by the ability of the condenser of the refrigeration system to transfer heat to the condenser cooling medium. This medium may be ambient air or it may be a liquid such as water or a solution containing an anti-freeze. The medium is in turn cooled by ambient air or a cooling tower.

At times, unless preventative action is taken, the pressure difference between delivery and suction can be too low to inject oil into the compressor. This can arise from either a high suction pressure, for example when the plant is started up after being turned off for a period, or it can arise from a low delivery pressure. The latter can again occur after the plant has been turned off for a period, or it can arise where the condenser cooling medium is at a very low temperature. Both high suction pressure and low delivery pressure can be present at the same time. In some cases the condition would clear if the plant were allowed to continue running—but it cannot due to lack of oil injection. In other cases the cooling medium may be so cold that the condition would persist.

To remedy this situation it is necessary to fit means to keep the delivery pressure (as "seen" by the compressor and the oil system) high. One such means is a delivery/suction pressure control valve downstream of the compressor delivery and the oil separator/reservoir but upstream of the condenser. Such a valve is expensive.

Positive displacement compressors that do not have mechanical delivery valves (for example screw and scroll compressors) tend to act as expanders and rotate backwards when the driving force is switched off until the pressures in the evaporator and condenser equalise. This reverse migration of refrigerant from the high to the low-pressure side of the system is undesirable, as is the reverse rotation of the compressor, which can cause mechanical damage. To prevent this a non-return valve (also known as a check valve) is often fitted to the delivery line, downstream of the compressor delivery and the oil separator/reservoir but upstream of the condenser.

SUMMARY OF THE INVENTION

It is an aim of the invention to provide a valve fulfilling the functions of both a delivery-to-suction pressure control valve and a non-return valve.

Accordingly, the invention provides a valve comprising a housing having an inlet and an outlet, and a pressure sensing port, a piston sidable in a part of the housing in response to a difference between a first fluid pressure at the pressure sensing port on the one side of the piston, and a second fluid pressure at the inlet and/or outlet on the other side of the piston, a valve member carried by the piston and operable thereby to close the inlet when said second fluid pressure is less than a value sufficiently greater than said first fluid pressure; wherein the valve member is movable with respect to the piston to facilitate closing of the inlet, in response to a fluid flow from the housing to the inlet, when the piston is not acting to close the inlet.

Thus, the pressure difference sensing can fulfil the delivery-to-suction pressure control function and the movement of the valve member with respect to the piston can provide the non-return function of the valve.

Piston biasing means may act to bias the piston into a position in which the valve member closes the inlet. This is one useful way of determining the sufficiency of the difference between the first and second fluid pressures. The biasing means may comprise one or more helical springs.

The valve member can be formed with an inlet surface arranged to come into contact with a valve seat of the inlet and an opposed surface facing into the housing. The valve member may have a stem slidably guided within a part of the piston. Valve member biasing means, such as a helical spring, may bias the valve member to close the inlet.

If the area of the opposed surface of the valve member is substantially equal to the area of a surface of the piston facing said opposed surface, the forces applied to these surfaces by the fluid pressure will tend to be equal, such that only the force applied to the inlet surface of the valve member has to be considered.

In a particular embodiment of the invention, manual shut-off means are provided for closing the valve, for example for maintenance purposes. The manual shut-off means may comprise a spindle having a non-round proximal portion and a threaded distal portion. The distal portion may be engaged in a non-rotatable threaded sleeve, the sleeve being slidable along the distal portion between a normal position in which the piston is movable and a maintenance position in which the sleeve retains the piston and the valve member in the closed position. For example, in the maintenance position a distal end of the sleeve may abut a facing surface of the piston.

BRIEF DESCRIPTION OF THE DRAWINGS

In order that the invention may be more readily understood, a particular embodiment thereof will now be described, by way of example only, with reference to the accompanying drawings, all showing a schematic section through a valve of the invention, and in which.

DETAILED DESCRIPTION OF THE INVENTION

Figure 1:
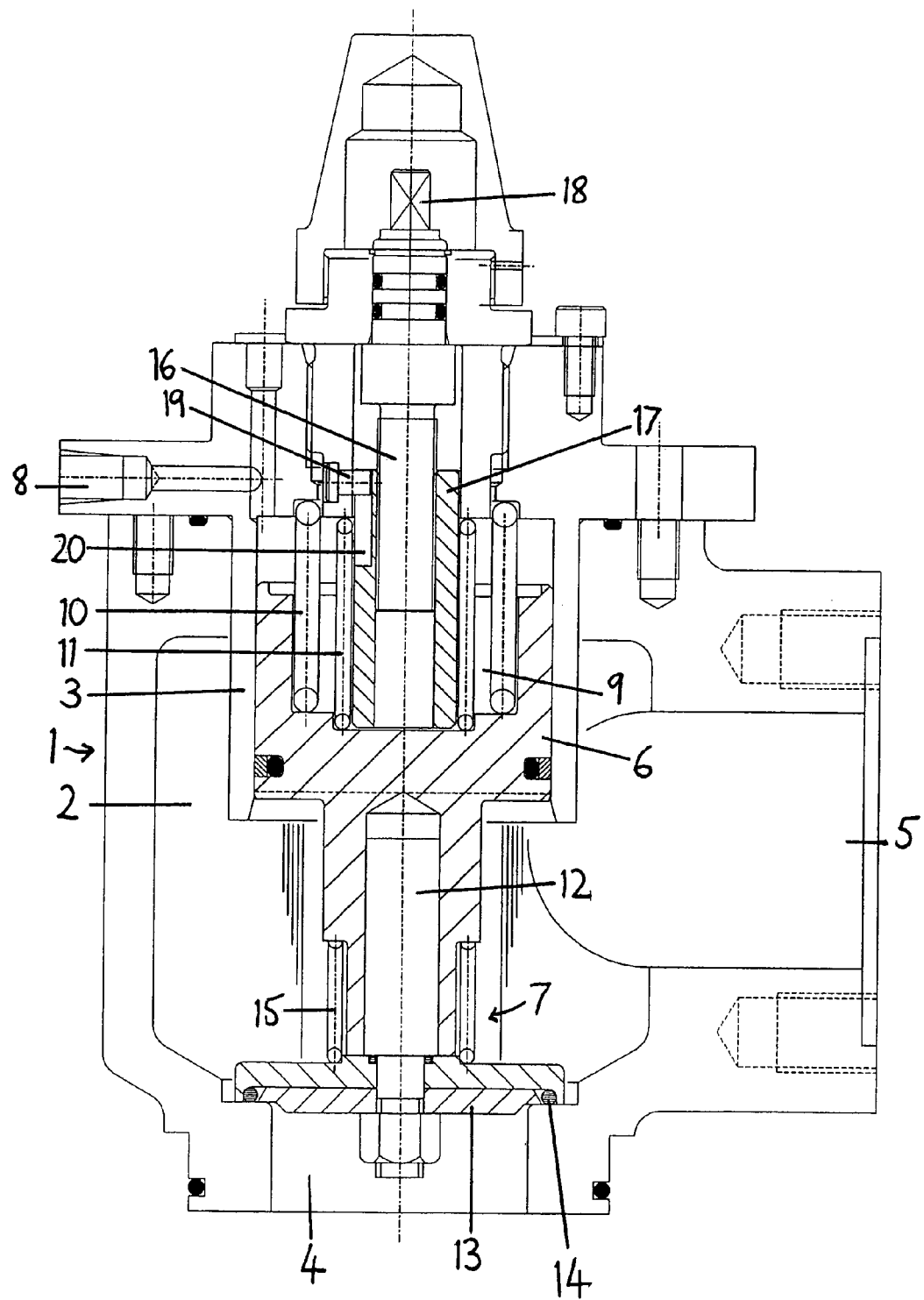
FIG. 1 shows the valve in the maintenance condition.

The drawings show a valve comprising a housing 1 having an operating chamber 2 and a cylinder 3 communicating therewith. The operating chamber 2 has an inlet 4 and an outlet 5. A piston 6, slidable in the cylinder 3 with a close fit, extends into the operating chamber 2, and carries a valve member 7 which is arranged to close the inlet 4.

At the end of the cylinder shown at the top in the drawings, a port 8 is provided for sensing a fluid pressure. Where the invention is used in a compressor arrangement, the port 8 may conveniently be connected to a suction side thereof.

A proximal end of the piston 6 has a generally cylindrical receptacle 9, in which two piston springs, such as helical compression springs, 10, 11 are mounted, one inside the other. The piston springs 10, 11 abut inner surfaces of the housing at one end and an opposing surface of the piston at the other end.

A distal end of the piston 6 is formed with a bore slidably receiving a stem 12 of the valve member 7. The valve member has a closing disk 13 attached to the stem 12 and arranged to close the inlet by means of an O-ring 14. A valve member spring 15 is mounted on the outside of the distal end of the piston, between the closing disk 13 and an opposed surface of the piston 6. In this example, the valve member spring 15 is a helical compression spring exerting a significantly weaker force than either of the piston springs 10, 11.

Manual shut-off means, located at the proximal end of the piston 6, comprise a spindle 16 threadingly engaged with a slidable sleeve 17. The proximal end 18 of the spindle 16 is non-round and extends from the housing. A peg 19, lodged in a part of the housing, extends into a longitudinal slot 20 in the sleeve.

The valve may, for example, have its inlet 4 connected to the delivery of a compressor and its outlet 5 connected to the condenser of a refrigeration systems.

FIG. 1 shows the valve in the closed maintenance condition, after the proximal end 18 of the spindle has been turned, for example using a spanner. Peg 19 prevents sleeve 17 from rotating, so that the engagement between the thread of spindle 16 and that of sleeve 17 forces the latter to move downwardly to the position shown. The distal end of sleeve 17 abuts an opposing surface of piston 6, thusly holding the piston in its most advanced position, i.e. the bottom of its stroke as viewed. In this position, valve member 7 is fully closed and valve member spring 15 is compressed. No fluid can enter the inlet 4.

Figure 2:
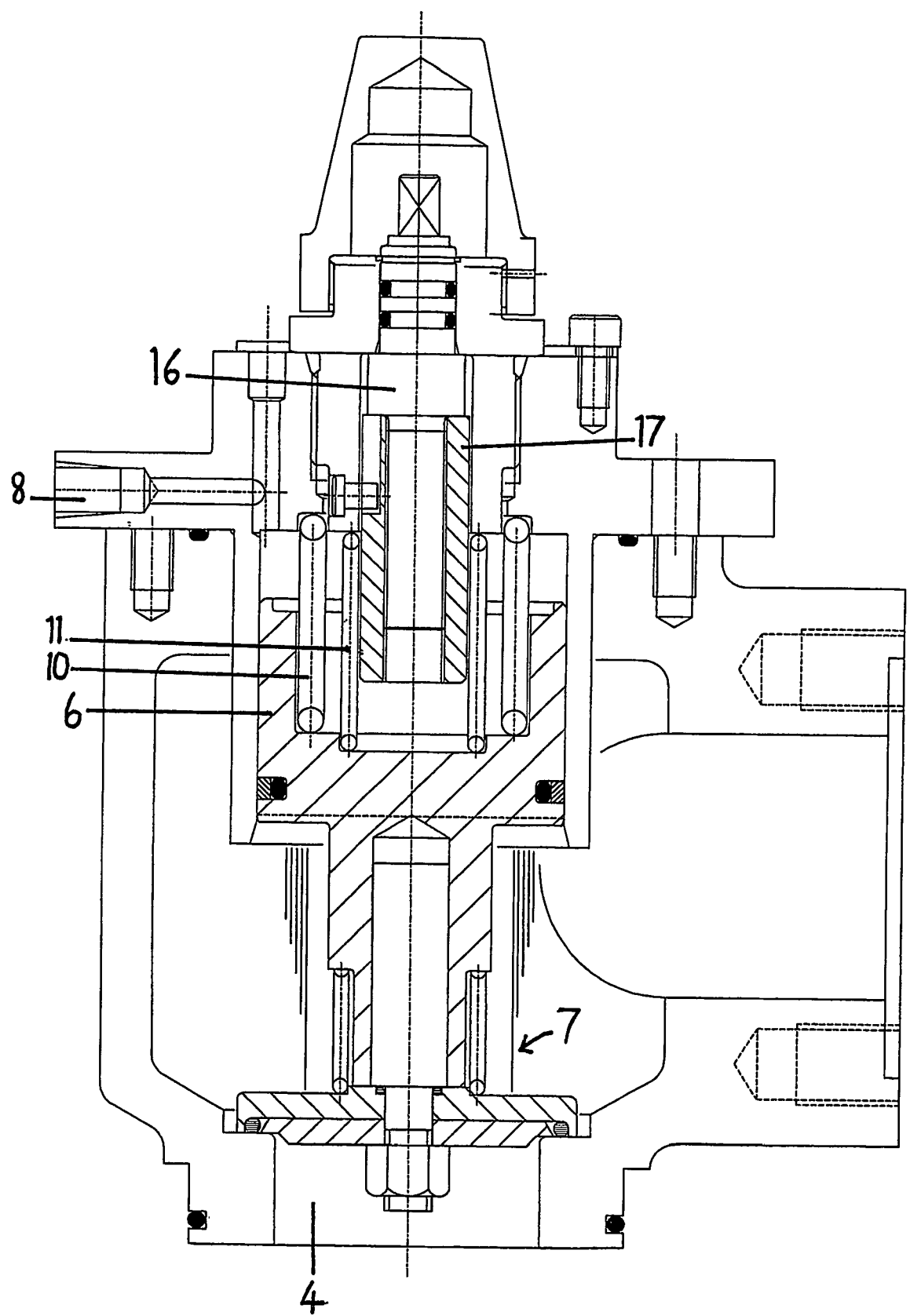
FIG. 2 shows the valve in a closed operative condition.

In FIG. 2, the valve is in the closed automatic or operative condition, spindle 16 having been fully turned, e.g. anti-clockwise, to raise sleeve 17 and release piston 6. However, the pressure sensed at port 8 is too high and/or the pressure on the outer surface of dosing disk 13 is too low. Piston springs 10, 11 are holding the piston 6 in its most advanced position so that valve member 7 closes inlet 4.

Figure 3:
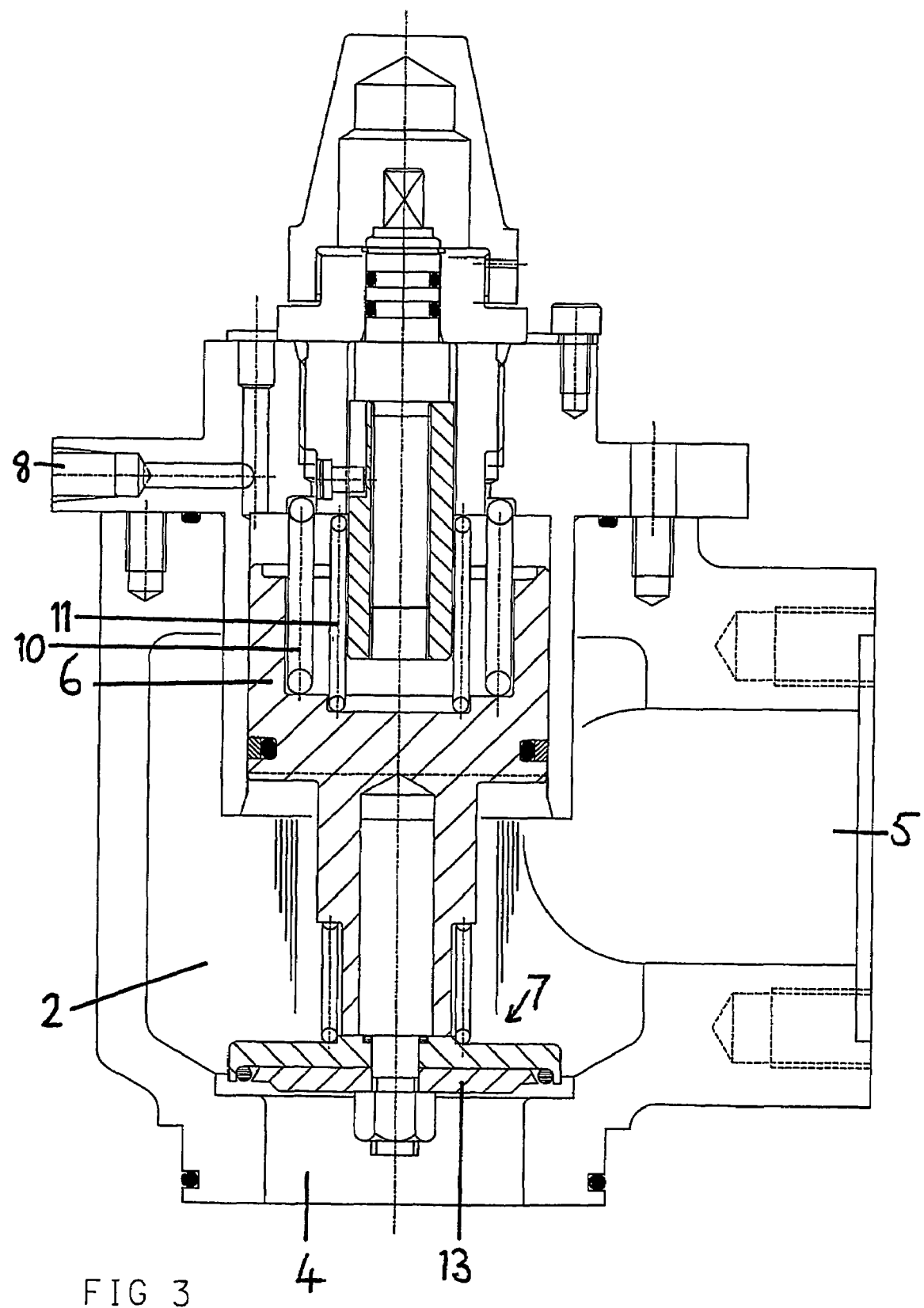
FIG. 3 shows the valve in a partially-opened operative condition.

FIG. 3 shows the valve in a partially-opened operative position. For example, the condenser pressure could be very low. There is enough pressure on the outer surface of closing disk 13, and on the distal surfaces of piston 6, to balance the pressure on the inner surface of closing disk 13, the pressure at port 8 (acting on the proximal surface of piston 6) and the force of piston springs 10, 11 which are more compressed than in FIG. 2. Valve member 7 is open by a few millimetres and there is a flow of fluid, e.g. gas, through inlet 4, into chamber 2 and out of outlet 5. The apparent delivery pressure of the compressor is higher than the valve outlet (condenser) pressure, and the pressure difference between apparent delivery and suction is sufficient to inject enough oil into the compressor.

The valve has a modulating action, opening and closing to maintain a predetermined minimum pressure difference between apparent delivery and suction.

Figure 4:
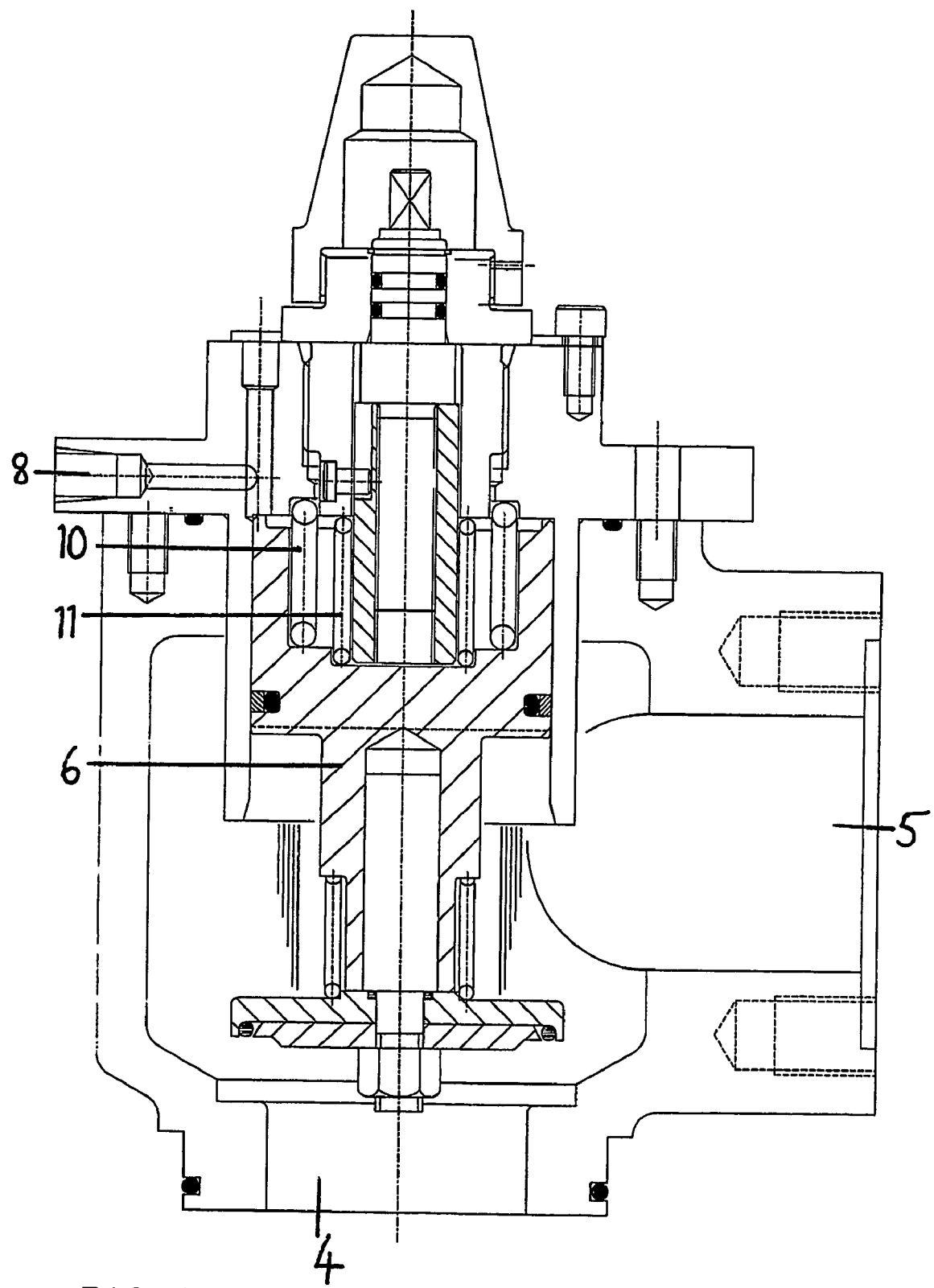
FIG. 4 shows the valve in a fully-opened operative condition.

FIG. 4 shows the valve in the fully-opened operative condition, in which the pressure difference is high across piston 6, the pressure in chamber 2 being significantly higher than the pressure at port 8. Springs 10, 11 are as compressed as possible. Fluid flows from inlet 4 to outlet 5 with only a small drop in pressure.

Figure 5:
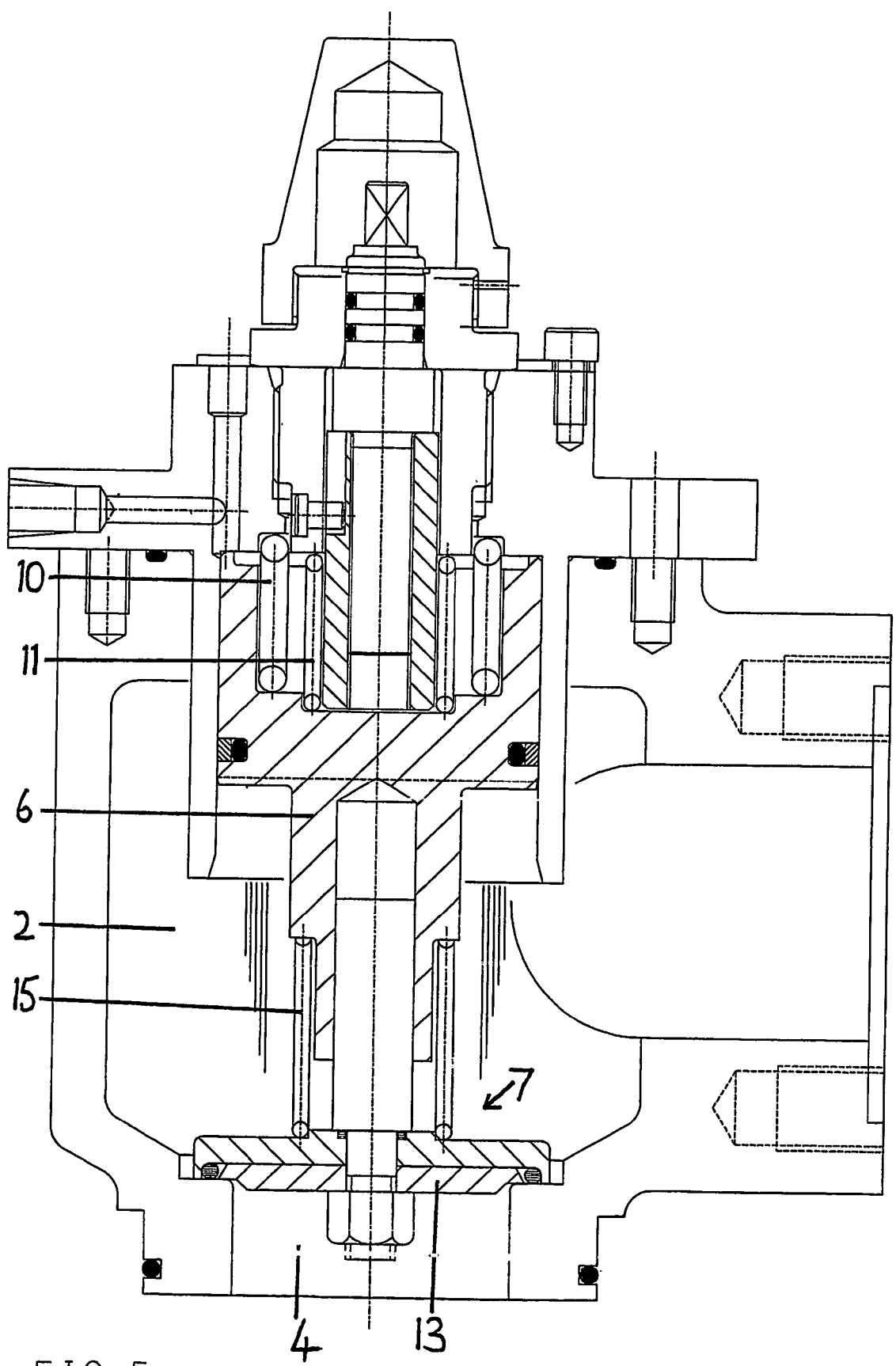
FIG. 5 shows the valve in a non-return condition.

FIG. 5 shows a condition in which fluid is tending to flow in reverse through the valve. For example, the compressor may have been switched off recently and there is still a large pressure difference across the piston 6 causing piston springs 10, 11 to remain compressed with the piston in its retracted position. "Weak" valve member spring 15, and the force of fluid in chamber 2 tending to flow towards closing disk 13, combine to extend valve member 7 from piston 6 and close inlet 4, thus preventing any reverse fluid flow.

It will therefore be seen that the invention has elegantly combined the functions of a pressure control valve and a non-return valve in a single unit Additionally, the inventive valve can in certain embodiments also provide manual shut-off for maintenance purposes.

An additional benefit of combining the functions of the two or three valves previously necessary is that every valve causes a concomitant pressure drop. Thus, use of the valve of the invention significantly improves the total pressure drop between inlet and outlet.

The invention claimed is:

1. A valve comprising a housing having an inlet and an outlet, and a pressure sensing port, a piston slidable in a part of the housing in response to a difference between a first fluid pressure at the pressure sensing port on the one side of the piston, and a second fluid pressure at the inlet and/or outlet on the other side of the piston, a valve member carried by the piston and operable thereby to close the inlet when said second fluid pressure is less than a value sufficiently greater than said first fluid pressure; wherein the valve member is movable with respect to the piston to facilitate closing of the inlet, in response to a fluid flow from the housing to the inlet, biasing means being arranged to bias the valve member with respect to the piston to close the inlet, when the piston is not acting to close the inlet, wherein manual shut-off means comprising a spindle having a non-round proximal portion and a threaded distal portion are provided for closing the valve, and wherein said distal portion is engaged in a non-rotatable threaded sleeve, the sleeve being slidable along the distal portion between a normal position in which the piston is movable and a maintenance position in which the sleeve retains the piston and the valve member in the closed position.

2. A valve according to claim 1, wherein piston biasing means are arranged to bias the piston into a position in which the valve member closes the inlet.

3. A valve according to claim 2, wherein the piston biasing means comprise one or more helical springs.

4. A valve according to claim 3, wherein the valve member is formed with an inlet surface arranged to come into contact with a valve seat of the inlet and an opposed surface facing into the housing.

5. A valve according to claim 2, wherein the valve member is formed with an inlet surface arranged to come into contact with a valve seat of the inlet and an opposed surface facing into the housing.

6. A valve according to claim 1, wherein the valve member is formed with an inlet surface arranged to come into contact with a valve seat of the inlet and an opposed surface facing into the housing.

7. A valve according to claim 6, wherein the area of the opposed surface of the valve member is substantially equal to the area of a surface of the piston facing said opposed surface.

8. A valve according to claim 6, wherein the valve member has a stem slidably guided within a part of the piston.

9. A valve according to claim 1, wherein the valve member has a stem slidably guided within a part of the piston.

10. A valve according to claim 9, wherein the valve member biasing means comprises a helical spring.

11. A valve according to claim 1, wherein the valve member biasing means comprises a helical spring.

12. A valve comprising:
a housing having an inlet and an outlet, and a pressure sensing port,
a piston slidable in a part of the housing in response to a difference between a first fluid pressure at the pressure sensing port on the one side of the piston, and a second fluid pressure at the inlet or at the outlet or at both the inlet and the outlet on the other side of the piston,
a valve member carried by the piston and operable thereby to close the inlet when the second fluid pressure is less than a value sufficiently greater than the first fluid pressure; wherein the valve member is movable with respect to the piston to facilitate closing of the inlet in response to a fluid flow from the housing to the inlet,
a spring biasing the valve member with respect to the piston to close the inlet when the piston is not acting to close the inlet,
a manual shut-off engaging the piston for moving the valve member against the inlet for manually closing the valve; and
a spindle having a non-round proximal portion and a threaded distal portion, wherein the distal portion is engaged in a non-rotatable threaded sleeve, the sleeve being slidable along the distal portion between a normal position in which the piston is movable and a maintenance position in which the sleeve retains the piston and the valve member in the closed position.

13. A valve according to claim 12, further comprising:
a spring biasing the piston into a position in which the valve member closes the inlet, or
one or more helical springs biasing the piston into a position in which the valve member closes the inlet.

14. A valve according to claim 12, wherein the valve member has an inlet surface arranged to come into contact with a valve seat of the inlet and an opposed surface facing into the housing.

15. A valve according to claim 14, wherein the area of the opposed surface of the valve member is substantially equal to the area of a surface of the piston facing the opposed surface.

16. A valve according to claim 12, wherein the valve member includes a stem slidably guided within a part of the piston.

17. A valve comprising:
a housing having an inlet and an outlet in fluid communication, having a cylinder part in fluid communication with the inlet and the outlet, and having a pressure sensing port in fluid communication with the cylinder part,
a piston slidable in the cylinder part of the housing in response to a difference in pressure between a first fluid pressure at the pressure sensing port on one side of the piston and a second fluid pressure at the inlet or at the outlet or at both the inlet and the outlet on an opposing side of the piston,
a valve member including a stem slidably guided by the piston and operable thereby to close the inlet when the second fluid pressure is less than a predetermined value sufficiently greater than the first fluid pressure; wherein the valve member is movable with respect to the piston to close the inlet in response to a fluid flow from the housing to the inlet and the valve member having an inlet surface arranged to come into contact with a valve seat of the inlet and an opposed surface facing into the housing,
at least one helical spring biasing the piston towards a position in which the valve member closes the inlet,
a second helical spring biasing the valve member with respect to the piston to close the inlet when the piston is not acting to close the inlet
a slidable non-rotatable threaded sleeve, and
a rotatable spindle having a threaded portion engaging the slidable non-rotatable threaded sleeve, wherein the sleeve is slidable between an operating position in which the piston is movable and a non-operating position in which the sleeve retains the piston and the valve member in a position to close the inlet,
wherein rotating the spindle in one direction moves the sleeve and piston to the non-operating position to move the valve member against the inlet for closing the valve and wherein rotating the spindle in an opposite direction moves the sleeve to the operating position to allow the piston and the valve member to move toward and away from the inlet for operating the valve.

* * * * *